US012611911B2

(12) United States Patent
Stout, II et al.

(10) Patent No.: US 12,611,911 B2
(45) Date of Patent: Apr. 28, 2026

(54) METHODS AND SYSTEMS FOR VENTILATING AIR FLOW IN A VEHICLE

(71) Applicant: FCA US LLC, Auburn Hills, MI (US)

(72) Inventors: Mark E Stout, II, Waterford, MI (US); Travis D Bechtel, Goodrich, MI (US)

(73) Assignee: FCA US LLC, Auburn Hills, MI (US)

( * ) Notice: Subject to any disclaimer, the term of this patent is extended or adjusted under 35 U.S.C. 154(b) by 274 days.

(21) Appl. No.: 18/345,484

(22) Filed: Jun. 30, 2023

(65) Prior Publication Data

US 2025/0001833 A1 Jan. 2, 2025

(51) Int. Cl.
B60H 1/00 (2006.01)

(52) U.S. Cl.
CPC ..... B60H 1/00742 (2013.01); B60H 1/00064 (2013.01); B60H 2001/00185 (2013.01)

(58) Field of Classification Search
CPC ........... B60H 1/00742; B60H 1/00064; B60H 2001/00185; B60H 1/00357; H04N 23/20
USPC .......................................................... 701/36
See application file for complete search history.

(56) References Cited

U.S. PATENT DOCUMENTS

| | | | | | |
|---|---|---|---|---|---|
| 6,454,178 | B1 * | 9/2002 | Fusco | .................... | B60H 1/008 165/203 |
| 8,494,227 | B2 * | 7/2013 | Prokoski | ............... | G06T 7/0012 382/270 |
| 9,457,639 | B2 * | 10/2016 | Wang | ................. | B60H 1/00871 |
| 9,517,679 | B2 * | 12/2016 | Frank | .................. | B60R 21/0154 |
| 9,862,247 | B2 * | 1/2018 | Perkins | .............. | B60H 1/00871 |
| 10,047,968 | B2 * | 8/2018 | Barooah | .................. | F24F 11/46 |
| 10,279,650 | B2 * | 5/2019 | Maranville | ........ | B60H 1/00971 |
| 10,369,865 | B2 * | 8/2019 | Perkins | .............. | B60H 1/00871 |
| 10,384,514 | B2 | 8/2019 | Perez Barrera | | |
| 10,449,828 | B2 | 10/2019 | Winget, Jr. et al. | | |
| 10,775,064 | B1 * | 9/2020 | Vega | ........................ | F24F 11/58 |
| 11,014,424 | B2 * | 5/2021 | Schumacher | ...... | B60H 1/00892 |
| 11,091,009 | B2 | 8/2021 | Skapof et al. | | |
| 11,235,638 | B2 * | 2/2022 | Neveu | .................. | G06V 10/143 |
| 11,472,258 | B2 * | 10/2022 | Han | ................... | B60H 1/00742 |
| 11,718,147 | B2 * | 8/2023 | Schumacher | .......... | B60N 2/268 165/204 |
| 11,801,730 | B1 * | 10/2023 | Vader | ................. | B60H 1/00357 |
| 12,479,268 | B2 * | 11/2025 | Looy | .................. | B60H 1/00835 |
| 2007/0114292 | A1 * | 5/2007 | Breed | ................ | B60H 1/00842 165/203 |
| 2008/0256967 | A1 * | 10/2008 | Errington | ........... | B60H 1/00742 62/244 |
| 2009/0229785 | A1 * | 9/2009 | Kadle | .................. | B60N 2/5628 297/180.12 |
| 2012/0312520 | A1 * | 12/2012 | Hoke | ................... | B60N 2/5628 219/217 |
| 2013/0314536 | A1 * | 11/2013 | Frank | ..................... | G06V 40/10 348/148 |
| 2015/0025738 | A1 * | 1/2015 | Tumas | ............... | B60H 1/00742 701/36 |
| 2015/0094914 | A1 * | 4/2015 | Abreu | ................ | B60H 1/00742 701/1 |
| 2016/0320081 | A1 * | 11/2016 | Nikovski | ............ | G06F 16/2228 |

(Continued)

*Primary Examiner* — Manglesh M Patel

(74) *Attorney, Agent, or Firm* — Jeremy J. Klobucar

(57) ABSTRACT

A thermal management system configured to analyze thermal condition data generated by at least one thermal sensor located in a vehicle of an occupant of the vehicle, and control a flow of conditioned air to the occupant based on the analyzed thermal condition data.

16 Claims, 6 Drawing Sheets

(56) References Cited

U.S. PATENT DOCUMENTS

| | | | |
|---|---|---|---|
| 2017/0088098 A1* | 3/2017 | Frank | G06V 10/40 |
| 2017/0268793 A1* | 9/2017 | Cardonha | F24F 11/62 |
| 2018/0072133 A1* | 3/2018 | Yamanaka | F24F 11/89 |
| 2018/0141408 A1* | 5/2018 | Filipkowski | B60H 1/00735 |
| 2018/0222414 A1* | 8/2018 | Ihlenburg | B60H 1/00357 |
| 2019/0275860 A1* | 9/2019 | Migneco | B60H 1/00742 |
| 2020/0143180 A1* | 5/2020 | Burzo | G06N 20/00 |
| 2020/0189353 A1* | 6/2020 | Shibuya | B60H 1/00742 |
| 2020/0276878 A1* | 9/2020 | Zhang | B60H 1/00985 |
| 2022/0005210 A1* | 1/2022 | Raveendran | B60H 1/00742 |
| 2023/0111256 A1* | 4/2023 | Looy | B60H 1/00871 |
| | | | 454/75 |
| 2024/0017591 A1* | 1/2024 | Feltham | B60H 1/00785 |
| 2025/0269698 A1* | 8/2025 | Kakade | B60H 1/00285 |

* cited by examiner

METHODS AND SYSTEMS FOR VENTILATING AIR FLOW IN A VEHICLE

FIELD

The present disclosure relates to ventilating air flow and more particularly to systems and methods for controlling ventilation of air flow in a vehicle.

BACKGROUND

This section provides background information related to the present disclosure which is not necessarily prior art.

Current HVAC system performance in a vehicle is based on time to temperature of certain locations on an occupant stand-in, and at the instrument panel of the vehicle. This time-to-temp based model does not translate directly to thermal comfort, resulting in significant energy being expended in many current production vehicles that still do not create a comfortable environment for the occupants of the vehicle. Moreover, current HVAC systems even go so far as to heat or cool areas of the vehicle where there is no occupant present. Heat loss through the windows of the vehicle causes this energy expended to heat/cool these unoccupied areas to go to waste, especially when ambient temperatures are particularly hot or cold.

SUMMARY

This section provides a general summary of the disclosure and is not a comprehensive disclosure of its full scope or all of its features.

According to a first aspect of the present disclosure, there is provided method for ventilating air flow in a vehicle to an occupant, the method comprises receiving thermal condition data of the occupant from at least one thermal sensor located in the vehicle, the thermal condition data defining areas of thermal variance of the occupant; determining, based on the areas of thermal variance of the occupant, whether at least one of the areas is a surface of the occupant experiencing thermal neglect; after determining whether there is a surface of the occupant experiencing thermal neglect, directing, using a motorized HVAC vent, conditioned air at or near the surface of the occupant experiencing thermal neglect for a time duration that does not oversaturate the surface of the occupant experiencing thermal neglect with the conditioned air; and receiving updated thermal condition data of the occupant during the directing of conditioned air at or near the surface of the occupant experiencing thermal neglect, and correcting a flow of the conditioned air to the occupant based on the updated thermal condition data.

According to the first aspect, the correcting includes at least one of updating an pattern of the flow of the conditioned air, an amount of the flow of conditioned air to the occupant, and a temperature of the conditioned air.

According to the first aspect, the pattern of the flow of the conditioned air includes sweeping the motorized HVAC vent at least one of back/forth and up/down or focusing the flow of conditioned air to a single point of the occupant.

According to the first aspect, the correcting the amount of the flow of conditioned air to the occupant includes damping the motorized HVAC vent.

According to the first aspect, the method may also include analyzing the areas of thermal variance to determine whether the occupant is wearing clothing, whether the occupant has exposed skin, and whether portions of occupant's body are oriented in various positions.

According to the first aspect, the method may also include, before receiving the thermal condition data of the occupant from the at least one thermal sensor, preconditioning a cabin of the vehicle using the motorized HVAC vent prior to the occupant entering the vehicle.

According to the first aspect, the preconditioning includes directing at least one of warm and cool air throughout the cabin using the motorized HVAC vent.

According to the first aspect, the method may also include after the preconditioning is complete and it has been determined that the occupant has entered the vehicle, and before thermal condition data of the occupant is received from the at least one thermal sensor, the method further comprises using the motorized HVAC vent to direct the conditioned air away from the occupant.

According to the first aspect, based on the areas of thermal variance of the occupant it is determined that multiple surfaces of the occupant are experiencing thermal neglect, the method further include analyzing the areas of thermal variance to prioritize addressing one of the multiple surfaces with the conditioned air before addressing the remaining surfaces of the multiple surfaces.

According to the first aspect, the one of the multiple surfaces that is prioritized is experiencing a greater amount of thermal neglect in comparison to the remaining surfaces of the multiple surfaces.

According to a second aspect of the present disclosure, there is provided a vehicle comprising a cabin including a plurality of seats that each include an occupant sensor configured to generate a signal indicative of whether an occupant is present in a respective seat; a thermal management system configured to provide thermal comfort to occupants of the vehicle, the thermal management system including: a thermal management electronic control module in communication with each of the occupant sensors and configured to receive the signals indicative of whether an occupant is present in a respective seat; at least one thermal sensor in communication with the thermal management electronic control module that is configured to generate thermal condition data of at least one occupant, the at least one thermal sensor generating the thermal condition data of the at least one occupant after receipt of an instruction from the thermal management electronic control module that is generated in response to the thermal management electronic control module receiving the signal from the occupant sensors; and an HVAC system in communication with the thermal management electronic control module, the HVAC system including a plurality of motorized HVAC vents, wherein the thermal management electronic control module is configured to receive the thermal condition data from the at least one thermal sensor and analyze the thermal condition data to determine areas of thermal variance of the at least one occupant; and after determining the areas of thermal variance of the at least one occupant, the thermal management electronic control module is configured to control the plurality of motorized HVAC vents to direct conditioned air to the at least one occupant based on the determined areas of thermal variance.

According to the second aspect, the determined areas of thermal variance include surfaces of the occupant that are experiencing thermal neglect, and the thermal management electronic control module is configured to control the motorized HVAC vents to direct the conditioned air at or near the surfaces that are experiencing thermal neglect.

According to the second aspect, the thermal management electronic control module is configured to control an amount of time that the motorized HVAC vents direct the conditioned air at or near the surfaces that are experiencing thermal neglect so as to not oversaturate the surfaces.

According to the second aspect, the vehicle may also include a thermal profile database in communication with the thermal management electronic control module.

According to the second aspect, the thermal profile database stores at least one of one or more lookup tables, one or more algorithms, and one or more machine learning models.

According to the second aspect, the thermal management electronic control module is configured to analyze the thermal condition data received from the at least one thermal sensor in combination with the at least one of one or more lookup tables, one or more algorithms, and one or more machine learning models to determine whether the at least one occupant has one or more characteristics.

According to the second aspect, the one or more characteristics include whether the at least one occupant has exposed skin, whether the at least one occupant is wearing clothing, whether the least one occupant has hair, and whether the at least one occupant has body parts arranged in a specific orientation.

According to the second aspect, the thermal management electronic control module is configured to precondition the cabin prior to receiving the signals from the occupant sensors.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. The example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

According to one aspect, the present disclosure provides methods and systems for ventilating airflow in a vehicle that is occupant focused. The methods and systems for directing airflow in the vehicle include detecting, using a thermal sensor, one or more surface areas of an occupant that are experiencing thermal neglect and directing the airflow to the one or more surfaces experiencing thermal neglect. One benefit of the present disclosure is that by providing conditioned air that is focused at surfaces of the occupant that are experiencing thermal neglect, instead of the entire internal cabin of the vehicle, the peak demand and continuous load on the heating, ventilation, and air conditioning (HVAC) system can be reduced. In this regard, if the vehicle is a battery-powered vehicle, less battery energy is expended such that the range of the electric vehicle is not negatively affected to too great of an extent. Another advantage of the present disclosure is that thermal comfort of the occupant(s) is more effectively and efficiently provided to the occupant(s) of the vehicle. Still another benefit is that the aiming and patterning of the flow of conditioned air can be specifically tailored and automatically controlled for a specific occupant (e.g., the driver).

Figure 1:
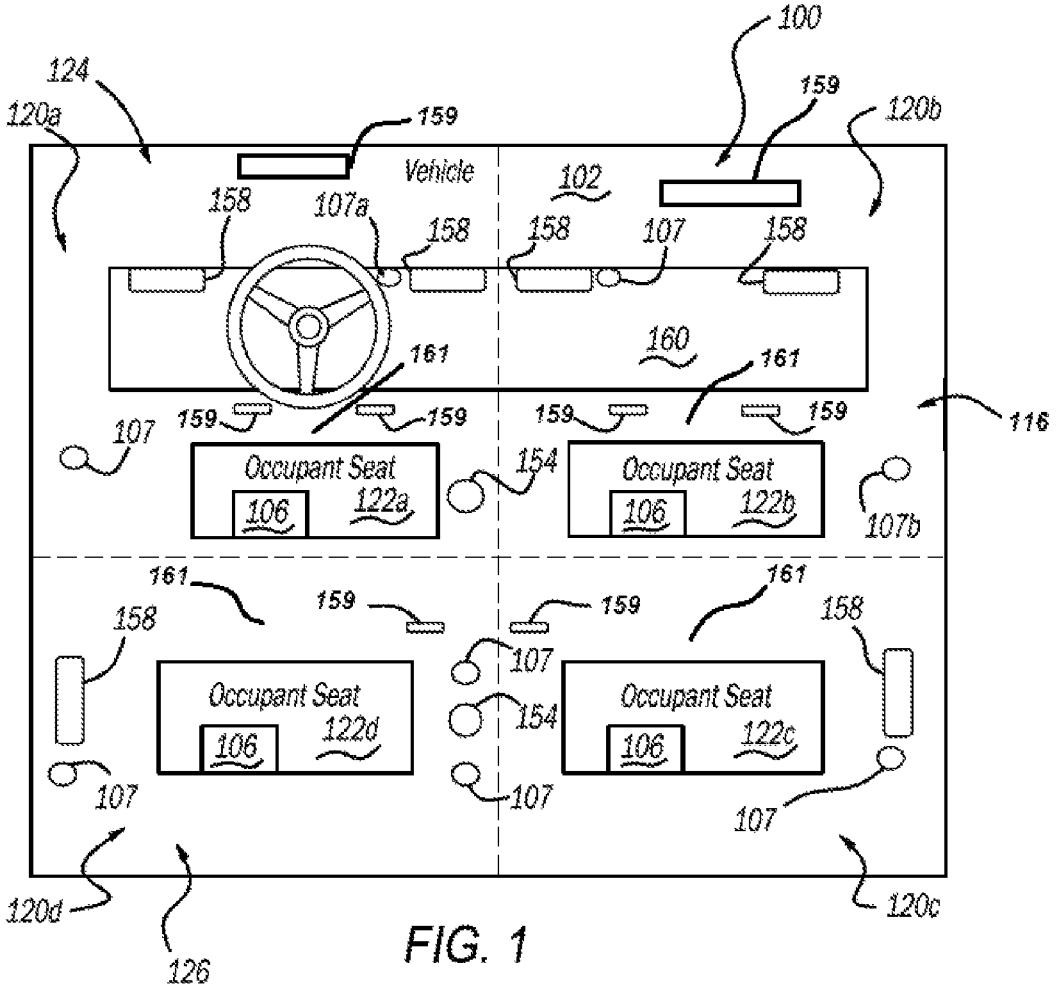
FIG. 1 is a schematic diagram of a vehicle having a thermal management system, according to a principle of the present disclosure.
Figure 2:
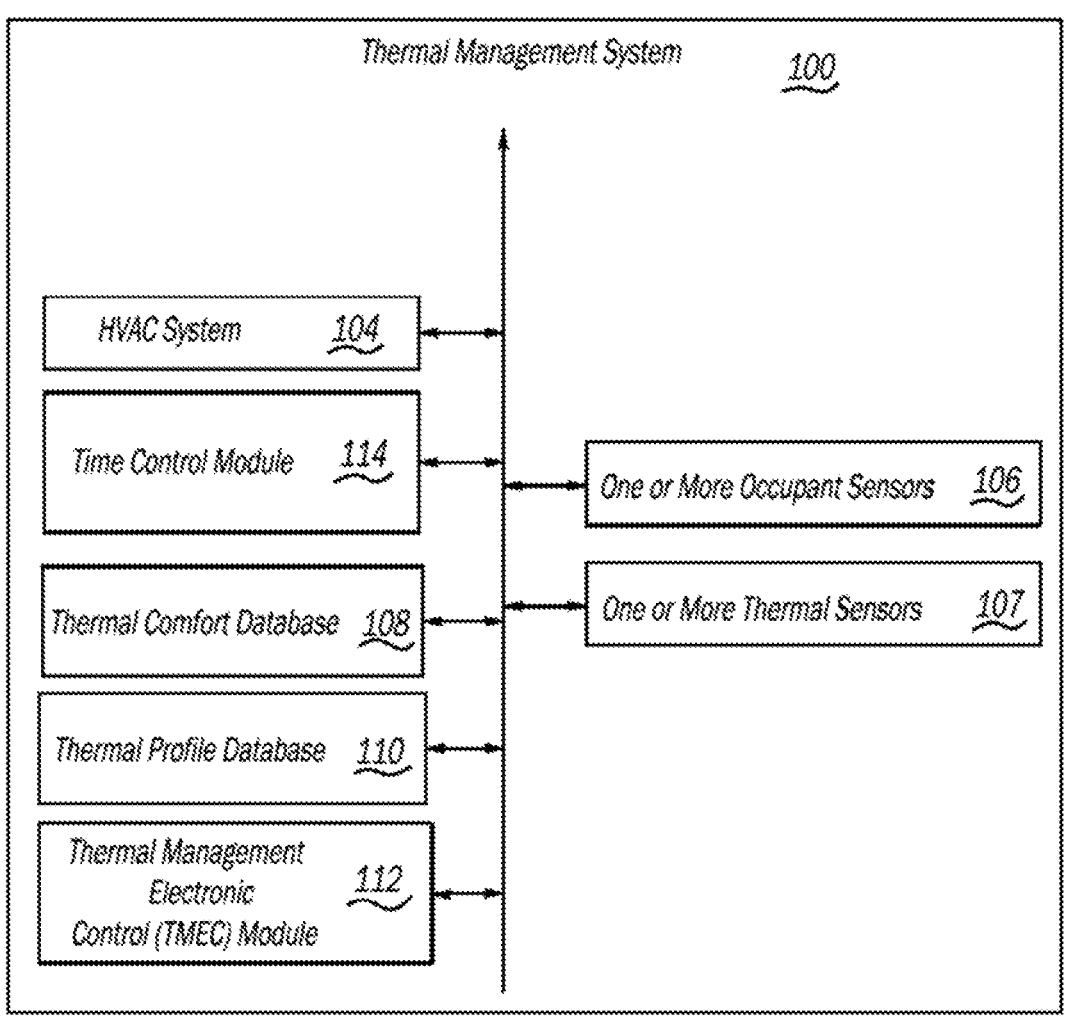
FIG. 2 is a block diagram of the thermal management system of FIG. 1.

Referring to FIGS. 1 and 2, a vehicle 102 (FIG. 1) including an example thermal management system 100 (FIG. 2) according to a principle of the present disclosure are illustrated. Vehicle 102 may be any type of vehicle known to one skilled in the art including conventional internal combustion engine powered vehicles, battery-powered vehicles, and hybrid-powered vehicles. Regardless of the type of propulsion system, the vehicle 102 may be an autonomous self-driving vehicle.

The thermal management system 100 may include a heating, ventilation, and air conditioning (HVAC) system 104 (FIG. 2), a plurality of occupant sensors 106, one or more thermal sensors 107, a thermal comfort database 108 (FIG. 2), a thermal profile database 110 (FIG. 2), a thermal management electronic control (TMEC) module 112 (FIG. 2), and a time control module 114 (FIG. 2). The HVAC system 104 is configured to condition the air provided into an interior cabin 116 of vehicle 102, and direct a flow of the conditioned air. The occupant sensors 106 are located within or proximate to occupant seats 122a-122d and in communication with the TMEC module 112. The TMEC module 112 is configured to control the delivery of the conditioned air to various locations of the interior cabin 116 based on its communication with the occupant sensor(s) 106, which will be described in more detail later.

As best shown in FIG. 1, the interior cabin 116 of the vehicle 102 may include a plurality of vehicle compartments 120a, 120b, 120c, and 120d (hereinafter the plurality of vehicle compartments 120a-120d shall collectively be designated with reference number 120) adjacent to one another, and a plurality of occupant seats 122a, 122b, 122c, and 122d (hereinafter the plurality of occupant seats shall be designated the reference number 122) in each respective compartment 120a-120d. In one example, the interior cabin 116 may include a front portion 124 and a rear portion 126. The front portion 124 includes a front left compartment 120*a* and a front right compartment 120*b* that are adjacent to each other, and the rear portion 126 includes a rear left compartment 120*c* and a rear right compartment 120*d* that are adjacent to each other.

Figure 3:
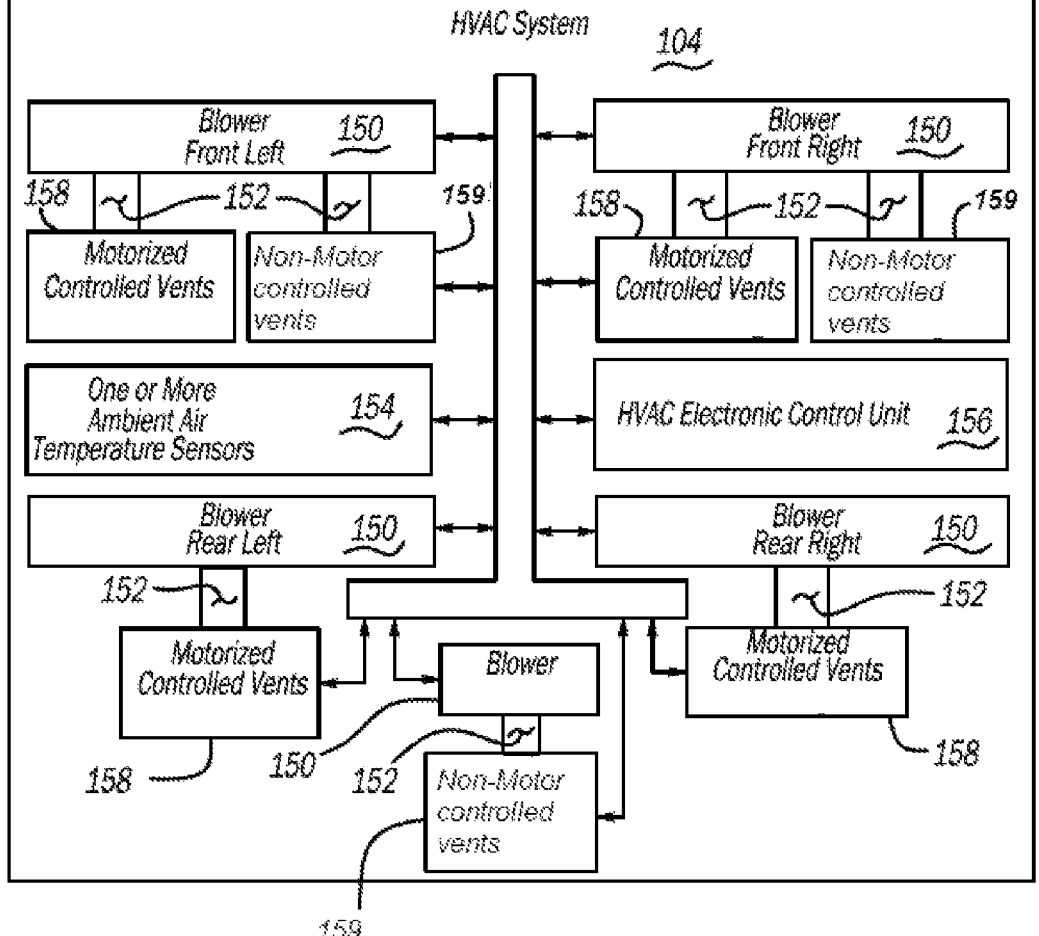
FIG. 3 is a schematic diagram of an HVAC system according to a principle of the present disclosure.

As best shown in FIG. 3, the HVAC system 104 includes, among other elements and features, one or more blowers 150, a plurality of air ducts 152 in communication with a respective blower 150, one or more ambient air temperature sensors 154, a plurality of HVAC vents 158 and 159 in fluid communication with a respective air duct 152, and a HVAC controller 156. HVAC vents 158 may be motorized, while HVAC vents 159 may be non-motorized. For example, HVAC vents 159 located forward of dashboard 160 (see, e.g., FIG. 1) for, for example, defrosting a windshield (not shown) of vehicle 102 may not be motorized. In addition, various HVAC vents 159 located throughout cabin 116 for providing conditioned air to, for example, footwells 161 of each compartment 120*a*-120*d* may not be motorized. Other locations throughout cabin 116 can also include non-motorized HVAC vents 159, without limitation. Notwithstanding HVAC vents 159 being non-motorized, the non-motorized HVAC vents 159 can still be used in combination with motorized HVAC vents 158 to control the thermal comfort of the occupant(s) of vehicle 102.

HVAC controller 156 is in communication with the blowers 150, the ambient air temperature sensors 154, and the motorized HVAC vents 158. HVAC controller 156 is configured to independently control the blowers 150 based on, for example, a signal generated by the ambient air temperature sensors 154 that is indicative of a temperature of a respective vehicle compartment 120. Moreover, HVAC controller 156 is configured to independently control each motorized HVAC vent 158 based on various factors that will be described in more detail later.

Each air duct 152 defines an airway for fluidly communicating a flow of conditioned air into a respective vehicle compartment 120, and the motorized and non-motorized HVAC vents 158 and 159 in communication with air ducts 152 are configured to direct the flow of conditioned air towards an occupant that may be located in a respective vehicle compartment 120. While it may be preferable that one ambient air sensor 154 be located within each vehicle compartment 120, it should be understood that only a single ambient air sensor 154 is necessary.

As noted above, HVAC vents 158 are motorized. Put another way, HVAC vents 158 are configured to move within the airway of the air ducts 152 such that the HVAC vents 158 can direct the flow of the conditioned air in various directions, as needed, based on instructions received from HVAC electronic control unit 156. While non-motorized HVAC vents 159 do not move based on instructions received from HVAC electronic control unit 156, the non-motorized HVAC vents 159 can still be manually activated (i.e., manually opened or closed) and manually positioned (e.g., aimed left, right, up, and down) based on an occupant's need.

Figure 4:
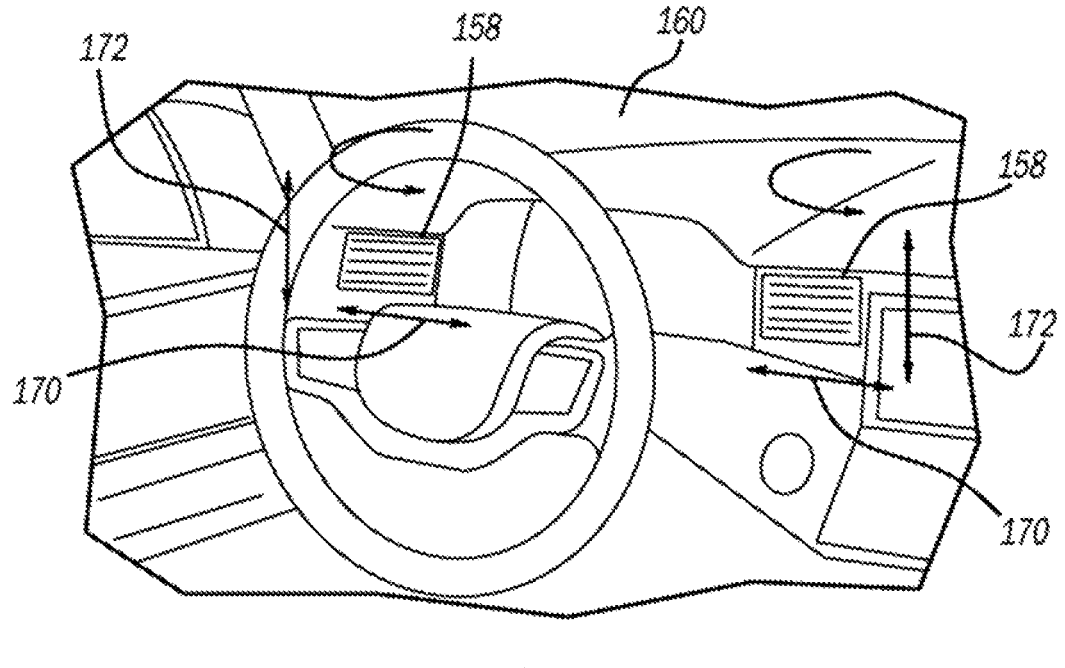
FIG. 4 is a perspective view of a portion of a dashboard within an internal cabin of the vehicle according to a principle of the present disclosure.

As best shown in FIG. 4, the movement of the motorized HVAC vents 158 may include a horizontal movement 170 and a vertical movement 172, and combinations thereof. In addition, it should be understood that motorized HVAC vents 158 include a motorized damper (not shown) that may be in communication with HVAC electronic control unit 158 to control (e.g., adjust) the amount of conditioned air permitted to pass through motorized HVAC vents 158. A plurality of the motorized HVAC vents 158 may be located in each respective vehicle compartment 120. For example, as best shown in FIG. 1, four motorized HVAC vents 158 may be located in front portion 124 of cabin 116 with the four motorized HVAC vents 158 being located on dashboard 160 of vehicle 102. While motorized HVAC vents 158 are illustrated as being located on dashboard 160, it should be understood that the motorized HVAC vents 158 may be located at other locations through front portion 124 of cabin 116 without limitation. While only two motorized HVAC vents 158 are illustrated in the rear portion 126 of cabin 116, a greater or lesser number of motorized HVAC vents 158 may be used in rear portion 126 of cabin 116, if desired.

In the rear portion 126 of cabin 116, the motorized HVAC vents 158 may be located proximate a rear vehicle door (not shown) (e.g., in a top or interior roof (not shown) of the vehicle 102, within a center console (not shown), or at any location within rear portion 126 of cabin 116 that can direct conditioned air toward occupants located in rear portion 126 of cabin 116.

Figure 5:
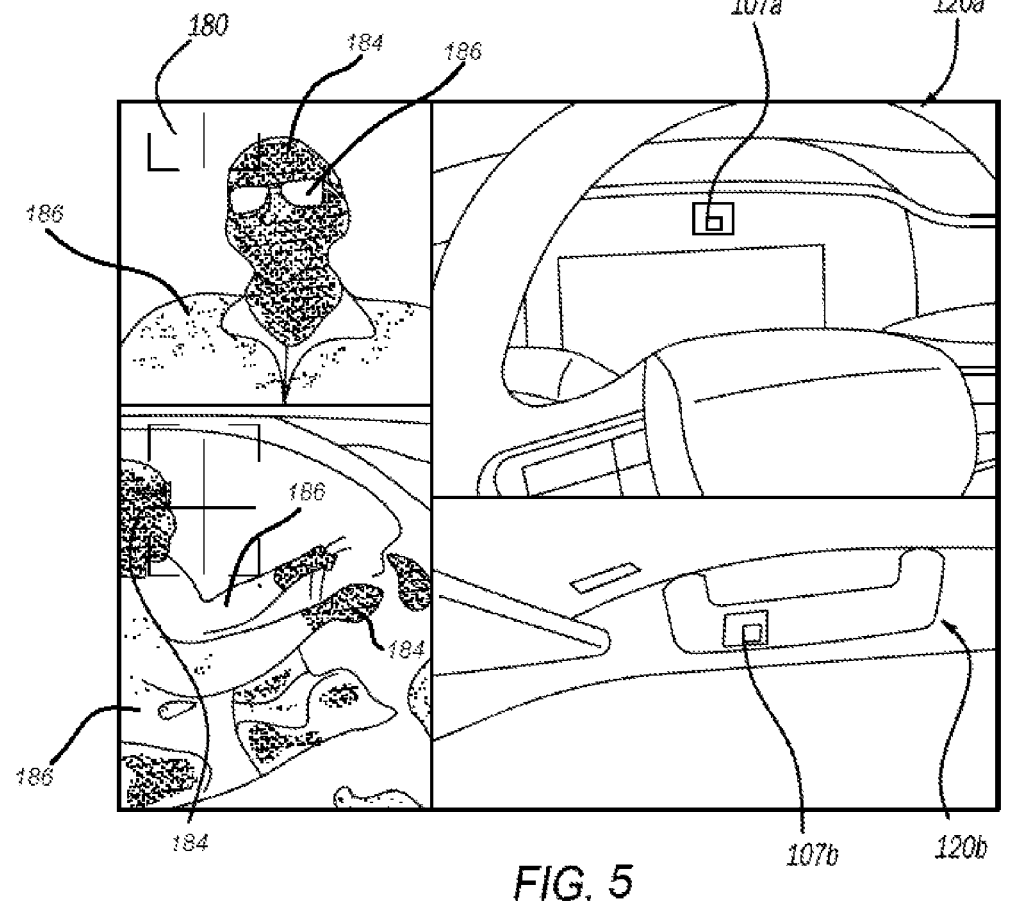
FIG. 5 illustrates a first thermal image and a second thermal image along with respective a first occupant sensor and a second occupant sensor, respectively according to the present disclosure.

Referring again to FIGS. 1-2, each of the thermal sensors 107 is configured to capture a thermal condition of an occupant seated within an occupant seat 122*a*-122*d* in a respective vehicle compartment 120*a*-120*d*. Example thermal sensors 107 include an infrared thermal camera. While only a single thermal sensor 107 is necessary, it is preferable that at least one thermal sensor 107 be installed and located within each vehicle compartment 120. For example, as shown in FIG. 5, the driver's compartment 120*a* may include a first thermal sensor 107*a* and the passenger's compartment 120*b* may include a second thermal sensor 107*b*. In addition, sensors 107*a* and 107*b* can be used in combination to provide thermal data relative to a respective occupant. For example, if only a driver is present, each sensor 107*a* and 107*b* may be used simultaneously to provide thermal data relative to the driver of the vehicle 102. Further, if a passenger in passenger compartment 120*b* is present in addition to the driver located in driver compartment 120*a*, each of the sensor 107*a*, 107*b* may be used simultaneously to provide thermal data relative to each of the driver and the passenger to provide thermal data that is different from each other (i.e., thermal sensor 107*a* alone may not be sufficient to provide complete thermal data relative to the driver such that thermal data received from thermal sensor 107*b* can be used to provide more comprehensive thermal data relative to the driver). The underlying premise with respect to thermal sensors 107 is that there is no requirement that there be a dedicated thermal sensor 107 in each compartment 120*a*-120*d*, and a single thermal sensor 107 can be used to capture thermal data of multiple occupants that may be located in vehicle 102.

Indeed, as best shown in FIG. 5, the first thermal sensor 107*a* that may be located within the dashboard 160 can be used to provide a first thermal view (image) 180 of the driver, while second thermal sensor 107*b* that is located in passenger compartment 120*b* can be used to provide a second and different thermal view (image) 182 of the driver that provides a more comprehensive thermal signature of the driver. Similarly, the first and second thermal sensors 107*a* and 107*b* can be used to simultaneously provide more comprehensive thermal data to other occupants (e.g., passengers) in vehicle 102. It should be understood that the locations of thermal sensors 107*a* and 107*b* in FIG. 5 are only examples, and the present disclosure should not be limited to the locations illustrated. In contrast, the location(s) selected for any of the thermal sensors 107 located in cabin 116 should be based on the thermal sensors 107 being able to detect an occupant's position fore-aft, left-right, and up-down as well as cover as large a portion of the occupant as possible.

It should also be understood that thermal sensors 107 may not be activated until TMEC module 112 receives a signal indicative of an occupant being present in a respective vehicle seat 122a-122d from a respective occupant sensor 106. After receiving the signal indicative of an occupant being present, TMEC module 112 may then send an instruction to thermal sensors 107 to begin obtaining thermal data of the occupant(s). As noted above, the thermal data can be obtained from a single thermal sensor 107 located proximate the occupant, or can be obtained from a plurality of thermal sensors 107 simultaneously. After receipt of the thermal data from the thermal sensor(s) 107, the thermal data may be communicated back to TMEC module 112. TMEC module 112 may then compare the thermal data obtained by thermal sensor(s) 107 with thermal profiles that are stored in thermal profile database 110.

Thermal profile database 110 (FIG. 2) may be configured to store one or more thermal profiles that may be accessed by TMEC 112 for comparison with the thermal data (signature) obtained by thermal sensors 107. Example thermal profiles may include at least one of one or more lookup tables, one or more algorithms, and one or more machine learning models. Based on the thermal data generated by the thermal sensor(s) 107, the lookup table, algorithm(s), and machine learning model(s) may be used to detect clothing worn by the occupant(s), a surface area of the occupant(s) covered by the clothing, and other physiologic data associated with the occupant(s) that indicates various thermal needs of the occupant(s).

It should be understood that thermal sensors 107 do not necessarily generate signals indicative of absolute temperature. While thermal sensors 107 are commercially available that can generate signals indicative of absolute temperatures, and these types of thermal sensors 107 are contemplated for use in thermal management system 100, it should be noted that these types of sensors are very expensive and not necessarily practical for use in thermal management system 100. Thermal sensors 107, therefore, are more generally configured to generate signals indicative of general thermal characteristics of the occupant(s). Put another way, thermal sensors 107 are configured to generate signals indicative of thermal variance of the occupant(s), and based on the data indicative of thermal variance, TMEC module 112 can communicate with thermal profile database 110 to determine areas (surfaces) of the occupant(s) that require attention to make the occupant(s) more thermally comfortable.

Based on the signals indicative of thermal variance generated by thermal sensor(s) 107 and the one or more lookup tables, one or more algorithms, and one or more machine learning models stored in thermal profile database 110, TMEC module 112 can determine whether the occupant(s) have exposed skin, the amount of clothing covering the occupant(s), whether the occupant(s) have long, short, or no hair, flushness of face, and other thermal characteristics that indicate the occupant's thermal conditions/need for conditioned air (whether warm or cool) to address areas of thermal neglect. Indeed, thermal management system 100 can determine whether an occupant's head is bald, includes short hair, or includes long/thick hair; whether an occupant's neck is exposed due to clothing being worn that does not have a collar, whether an occupant's neck is partially exposed due to the clothing including a hood or collar, or not exposed due to the occupant wearing a scarf; whether an occupant's torso is wearing a light (e.g., cotton) shirt, a heavier fabric (e.g., flannel or shell-type) shirt or jacket, or a winter coat; whether an occupant's arms are covered by a short-sleeve or long-sleeve shirt; whether an occupant's hands are exposed, wearing light gloves, or wearing heavy gloves; whether an occupant's shirt is not zipped, partially zipped, or fully zipped; whether the occupant is wearing shorts, pants, and whether the shorts or pants are made of a light or heavy material; and whether the occupant is wearing a hat and whether the hat is covering or partially covering the occupant's ears. For example, again referring to FIG. 5, it can be seen that an occupant includes an exposed face and hands (shaded regions 184) and is wearing clothing (non-shaded regions 186) that is covering the occupant's torso, arms, and legs.

Thermal management system 100 can also determine, based on data received from thermal sensors 107, a hand location on a steering wheel of the vehicle 102, a leg splay of the occupant, and a posture of the occupant, and use this information to determine the best manner to provide the occupant with thermal comfort. Other information that can be determined includes a condition of the occupant upon entry into vehicle 102 (i.e., whether the occupant is hot, room temperature, cool, or cold).

The shaded and unshaded regions shown in FIG. 5 define thermal variances of the occupant, and it can be determined that these different regions each have different relative temperatures based on the boundaries between these regions. While no colors are shown in FIG. 5, it can be determined by TMEC module 112 that the occupant's face and hands (regions 184) are either hot or cold and require attention. It should be understood that, in practice, the thermal data generated by thermal sensors 107 will generate images 180, 182 that indicate whether the regions 184 are hot or cold because the images 180, 182 will be colored (e.g., red, orange and yellow for hot; black, purple, and blue for cold; green for neutral, etc.). For example, if the occupant's face and hands 184 are red and the rest of the image is blue, it can be determined that the occupant's face and hands are most likely cold and require warmer conditioned air to address these areas of thermal neglect. Inasmuch as thermal sensors 107 may only generate general thermal data (i.e., the data does not include absolute temperature data), TMEC module 112 in conjunction with thermal profile database 110 is merely looking for regions (e.g., 184) or thermal boundaries of the thermal data generated by thermal sensors 107 to find features of the occupant (e.g., exposed skin, clothing, hair, etc.) and the environment surrounding occupant to make judgements regarding relative temperature that require attention. After determining the surfaces/regions of the occupant(s) that may be experiencing thermal neglect, the surfaces/regions of the occupant(s) experiencing the most thermal neglect can be addressed using HVAC system 104 through instructions output by TMEC 112, as will be described in more detail below.

As noted above, HVAC vents 158 are motorized to be movable and damped. Motors of the HVAC vents 158, as noted above, are in communication with HVAC controller 156, which may be in communication with TMEC module 112. Thus, based on an instruction sent by TMEC module 112 to HVAC controller 156, motors of the HVAC vents 158 can be controlled to direct and damp conditioned air to, or at least at or near, the surfaces of the occupant(s) that are experiencing thermal neglect. For example, based on the thermal data (different regions/boundaries of color) generated by thermal sensors 107 and the comparison of the thermal data with a thermal profile stored in thermal profile database 110, TMEC module 112 may identify the driver of the vehicle 102 as having various areas of thermal neglect. For example, TMEC module 112 may determine that the driver's hands require more attention in comparison to, for example, the driver's torso. Based on these determinations, TMEC module 112 can instruct HVAC controller 156 to control motors of various HVAC vents 158 to address the driver's hands first, before addressing the driver's torso. Alternatively, a first number of the HVAC vents 158 can be controlled by HVAC controller 156 (via instructions received from TMEC module 112) to address the thermal neglect being experienced by the driver's hands and a second and lesser number of HVAC vents 158 can be controlled by TMEC module 112 to address the thermal neglect being experienced by the driver's torso. In any event, TMEC module 112 sends instructions HVAC controller 156, which then sends instructions to the motors of the HVAC vents 158 to direct the conditioned air to, or at least at or near, the driver's hands and torso (rather than, for example, the driver's face, legs, and arms) to address the areas of thermal neglect.

TMEC module 112 is also in communication with a time control module 114, and time control module 114 is configured to control the duration of the directed air flow provided by HVAC vents 158. That is, based on a signal received from time control module 114 transmitted to TMEC module 112 that is subsequently transmitted to HVAC controller 156, HVAC module 156 can control motors of the HVAC vents 158 for the amount of time determined by time control module 114. For example, time control module 114 can limit the initial duration of the directed conditioned airflow to the areas of thermal neglect for a time period of, for example, up to three minutes. After the conclusion of this initial duration, TMEC module 112 may receive additional thermal data from thermal sensors 107 and again conducting a comparison of the thermal data with the thermal profiles stored in thermal profile database 110. If after the comparison the areas of thermal neglect remain the same, TMEC module 112 may again instruct HVAC controller 156 to control HVAC vents 158 to continue directing the conditioned air to the areas of thermal neglect. On the other hand, if it is determined that the areas of thermal neglect have been addressed during the initial duration, time control module 114 may permit a period of transition that lasts between, for example, five to fifteen minutes where other areas of the occupant can be addressed. After this transition period, the time control module 114 may permit a steady-state of conditioned air flow that is just enough and aimed at the desired locations (determined through thermal imaging by thermal sensors 107) to maintain the occupant's comfort. The duration of steady-state may be up to and in excess of fifteen minutes, for example. The period of transition may include either pre-programmed or occupant-specific steps in aiming, temperature set point, or blower speed that are deemed most comfortable for the occupant(s). The primary point to keep in mind is that thermal management system 100 is not always determining surfaces/regions of thermal neglect, and may instead move to a more pre-programmed strategy to apply diffused air to larger areas of cabin 116.

Moreover, it should be understood that thermal management system 100 preferably avoids oversaturating the surfaces/regions of the occupant(s) with conditioned air. For example, aiming warm or hot conditioned air at an occupant's face for a relatively long period of time (e.g., about two minutes) may cause discomfort (e.g., dry eyes) even if that area appears to be experiencing thermal neglect or discomfort. Thus, to avoid oversaturation of a particular surface/region, the initial period or other periods may be adjusted accordingly.

HVAC vents 158 may be controlled by HVAC controller 156 (via TMEC module 112) to direct the flow of conditioned air in various manners. For example, HVAC vents 158 may be controlled to cover and focus on a single point that corresponds to one of the areas/surfaces of the occupant experiencing thermal neglect. In this manner, example the TMEC module 112 may instruct HVAC controller 156 to aim one or more HVAC vents 158 such that the flow of conditioned air converges at the single point instead of dispersing the flow of condition air throughout the entire interior cabin 116 of the vehicle 102.

Alternatively, HVAC controller 156 (via TMEC module 112) is configured to control one motorized HVAC vent 158 to target a first detected surface area experiencing thermal neglect and control another motorized HVAC vent 158 to target a second detected surface area that is different from the first detected surface area and also experiencing thermal neglect. For example, HVAC controller 156 is configured to control one motorized HVAC vent 158 to direct conditioned air towards legs of the occupant and control one or more motorized HVAC vents 158 to direct conditioned air towards the face of the occupant. It should be understood, however, that the second detected surface area does not necessarily need to be experiencing thermal neglect.

Figures 6, 7:
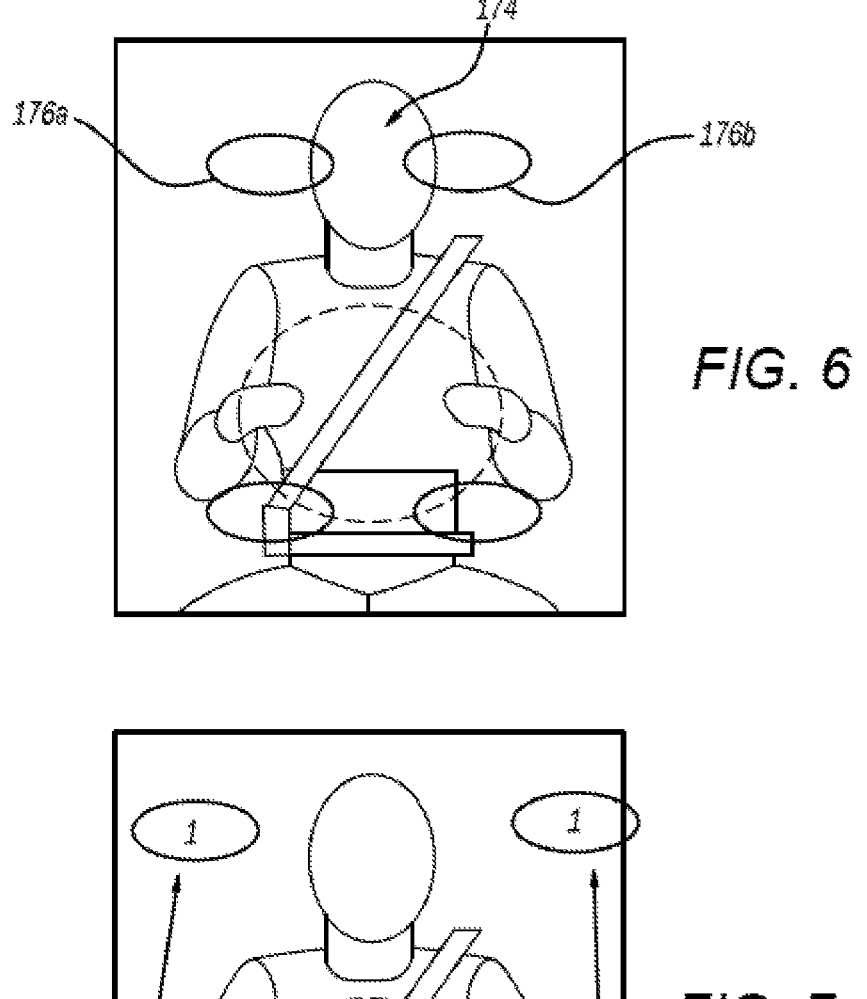
FIG. 6 illustrates one or more surface areas of an occupant detected experiencing thermal neglect according to the present disclosure.
FIG. 7 illustrates an air flow pattern for one or more heating, ventilation, and air conditioning vents to use to target the one or more surface areas of the occupant in FIG. 6 according to the present disclosure.

The single point aiming/damping of each HVAC vent 158 is illustrated in FIG. 6. In this example, HVAC controller 156 (via instructions received from TMEC module 112) is configured to control at least two HVAC vents 158 to direct conditioned air towards a face 174 of an occupant, where one or more HVAC vents 158 are aimed toward one side 176a of the face 174 of the occupant and one or more HVAC vents 158 are aimed toward the other side 176b of the face of the occupant. This configuration allows at least two HVAC vents 158 to mirror one another for symmetric occupant coverage and converge at one single point (i.e., the occupant's face).

In another example, the HVAC controller 156 (via instructions received from TMEC module 112) is configured to instruct HVAC vents 158 a move in various same or different directions to define a flow pattern of the flow of conditioned air toward the occupant (see, e.g., FIG. 4). In one example, the flow pattern may include a single back and forth sweeping pattern or multiple back and forth sweeping patterns that can provide a "massaging" effect that is experienced by the occupant. Another example is a three-point back and forth sweeping pattern, which is shown in FIG. 7.

Referring to FIG. 7, the 3-point back and forth sweeping pattern may include different locations of coverage, different speeds of sweep, and different damping at each point 1, 2, and 3. In one form, the 3-point back and forth sweeping pattern can include aiming the HVAC vent 158 at a first point 1 (e.g., a face area), lowering the HVAC vent to a second point 2 (e.g., an arm area), and moving the HVAC vent to a third point 3 (a core or torso area). At each point 1, 2, and 3, the HVAC vents 158 may perform a back and forth sweeping pattern before moving on to the next point. The 3-point back and forth sweeping pattern may be desirable by the occupant(s) after their areas of thermal neglect have been satisfied, and long term comfort is more desirable (i.e., during steady-state operation). It should be understood, however, that this pattern may also be used while addressing the surfaces and areas experiencing thermal neglect.

According to the above-described process, the use of directed airflow can be used to address areas/surfaces of the occupant that are experiencing thermal neglect without the HVAC system 104 unnecessarily attempting to heat/cool the entire cabin 116 of vehicle 102. By focusing the air flow to the areas of thermal neglect rather than trying to heat/cool the entire cabin 116 of vehicle 102, the time expended by HVAC system 104 to yield occupant comfort can be reduced up to 62%. Moreover, when HVAC system 104 transitions to steady-state, a reduction in energy up to 23% can be achieved. This is particularly advantageous when vehicle 102 is an electric vehicle that relies on battery power to control HVAC system 104.

In essence, thermal management system 100 is configured to monitor thermal conditions of the occupant(s) and control/correct the flow of conditioned air to the occupant based on the monitored thermal conditions to avoid manual occupant-input correction of the flow of conditioned air. This is accomplished by obtaining thermal data from thermal sensors 107 and using thermal profiles stored in thermal profile database 110. Subjective user data that is gathered during testing of thermal management system 100 before integration into vehicle 102 may be incorporated into the thermal profiles stored in thermal provide database 110. For example, after an initial warm up of occupants during testing, it may be learned that occupants prefer warm or hot air be directed away from their face even though the thermal data generated by thermal sensors 107 indicates that the occupant's face requires attention. Accordingly, thermal management system 100 may be designed to direct the conditioned air away from the occupant's face after a duration of time, or the initial duration set by time control module 114 can be shortened.

While thermal management system 100 has been described above as addressing areas of thermal neglect that are being experienced by an occupant of the vehicle 102, it should be understood that thermal management system 100 may also be used to heat and/or cool cabin 116 (i.e., precondition the cabin 116) before an occupant has entered the vehicle 102. For example, the vehicle 102 may be started remotely and upon vehicle 102 being started remotely, thermal management system 100 can begin to heat and/or cool vehicle 102 based on signals indicative of temperature transmitted by ambient temperature sensors 154 to TMEC module 112. Based on the signals received by ambient temperature sensors 154, TMEC module 112 can then instruct HVAC system 104 to begin generating heated and/or cooled air to be dispersed in vehicle cabin 116 using HVAC vents 158. Further, in addition to receiving signals indicative of temperature from ambient temperature sensors 154, TMEC module 112 can instruct thermal sensors 107 to transmit thermal data of vehicle cabin 116 and then instruct HVAC vents 158 to various locations of cabin 116 that require more heating and/or cooling in comparison to other locations of vehicle cabin 116. It should also be understood that TMEC module 112 can control windows of vehicle 102 during the pre-conditioning of cabin 116. For example, if it is determined that cabin 116 is very hot, the vehicle windows can be slightly opened and motorized HVAC vents 158 can be aimed in a certain direction to move air out of cabin 116 through the windows.

In another embodiment, the thermal management system 100 is configured to generate a flow of conditioned air to an occupant based on a preset occupant air flow profile. In this regard, many vehicles in today's market may be programmed to account for, for example, different drivers of the vehicle 102. For example, one driver of vehicle 102 may prefer the seat 122a to be located in a certain position relative to the steering wheel (not shown) located at dashboard 160, the acceleration pedal (not illustrated) in a certain location, and the location of the steering wheel relative to the dashboard 160 at a certain location, while another driver may prefer different positions and/or orientations of these variables. Thermal management system 100 may be preset in a similar manner to, for example, a particular driver's thermal management preferences, and these preferences may be stored in thermal comfort database 108 that may be accessed by TMEC module 112.

For example, upon entry of a particular driver into vehicle 102 that has stored his or hers thermal management preferences into thermal management system 100, the driver may press a button (not shown) that moves the seat, steering wheel, and accelerator pedal to the desired positions, and also serves as an instruction to TMEC module 112 to instruct HVAC controller 156 to control HVAC vents 158 to begin generating conditioned air at the desired temperature and desired pattern.

This instruction provided by TMEC module 112 may also be based on signals indicative of temperature received from ambient temperature sensors 154. That is, if the ambient temperature sensors 154 indicate that the temperature within cabin 116 is cold, for example, this information can be used by TMEC module 112 to instruct HVAC controller 156 to have HVAC system 104 generate warmer conditioned air. A similar process can be used if the temperature detected by ambient temperature sensor(s) 154 is warm to have HVAC system 104 generate cooler conditioned air. In another example, a solar load may be used to determine whether heat/cool cabin 116.

The desired temperatures and patterns of directed conditioned air, under certain conditions (e.g., warm weather and cold weather) may be preselected by the driver and input into thermal management system 100 using, for example, a graphic user interface 200 that may be located on dashboard 160. Alternatively, the desired temperatures and patterns may be input into an app located on a smart phone, tablet, or computer and transmitted wirelessly to TMEC module 112.

Moreover, even if a preset profile has been selected, it should be understood that thermal management system 100 can alter the temperature and flow of conditioned air using the protocol noted above. That is, TMEC module 112 will periodically request thermal data from thermal sensors 107 and, based on the thermal data received from thermal sensors 107, redirect the airflow and/or its temperature based on areas of the driver that are experiencing thermal neglect. Other occupants that frequently travel in vehicle 102 may also input preset thermal management profiles into thermal management system 100 such that each seat 122a-122d can be have pre-selected thermal management profiles stored in thermal comfort database 108 for access by TMEC 112.

It should also be understood that thermal management system 100 is configured to use artificial intelligence to learn the desired thermal management profiles of each occupant. In this regard, TMEC module 112, based on feedback received through manual operation of various devices (e.g., manual movement of knobs, switches, and the like) that permit control of various features of thermal management system, can monitor the manual manipulation of these various features and use this information for future thermal management consideration. For example, even in an occupant has selected a preset thermal management profile for receiving desired thermal comfort, based on manual changes that the occupant makes to the thermal management system after various periods of time, TMEC module 112 can learn that after a particular amount of time has passed using the preset conditions, the occupant typically increases and/or reduces the amount of conditioned air received at a particular location. Using this information, TMEC module 112 can learn that the amount of conditioned air needs to be adjusted after this period of time elapses. This is equally applicable to occupant-initiated changes in temperature after various periods of time elapse.

In this application, the term "module", "control system", "control unit" and/or "controller" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for ventilating air flow in a vehicle to an occupant, the method comprising:

receiving thermal condition data of the occupant from at least one thermal sensor located in the vehicle, the thermal condition data defining areas of thermal variance of the occupant;

determining, based on the areas of thermal variance of the occupant, whether at least one of the areas is a surface of the occupant experiencing thermal neglect;

after determining whether there is a surface of the occupant experiencing thermal neglect, directing, using a motorized HVAC vent, conditioned air at or near the surface of the occupant experiencing thermal neglect for a time duration that does not oversaturate the surface of the occupant experiencing thermal neglect with the conditioned air; and receiving updated thermal condition data of the occupant during the directing of conditioned air at or near the surface of the occupant experiencing thermal neglect, and correcting a flow of the conditioned air to the occupant based on the updated thermal condition data, wherein the correcting includes updating a pattern of the flow of the conditioned air and the pattern of the flow of the conditioned air includes sweeping the motorized HVAC vent at least one of back/forth and up/down or focusing the flow of conditioned air to a single point of the occupant.

2. The method of claim 1, wherein the correcting further includes at least one of updating an amount of the flow of conditioned air to the occupant and a temperature of the conditioned air.

3. The method of claim 2, wherein the correcting the amount of the flow of conditioned air to the occupant includes damping the motorized HVAC vent.

4. The method of claim 1, further comprising analyzing the areas of thermal variance to determine whether the occupant is wearing clothing, whether the occupant has exposed skin, and whether portions of occupant's body are oriented in various positions.

5. The method of claim 1, further comprising, before receiving the thermal condition data of the occupant from the at least one thermal sensor, preconditioning a cabin of the vehicle using the motorized HVAC vent prior to the occupant entering the vehicle.

6. The method of claim 5, wherein the preconditioning includes directing at least one of warm and cool air throughout the cabin using the motorized HVAC vent.

7. The method of claim 5, wherein after the preconditioning is complete and it has been determined that the occupant has entered the vehicle, and before thermal condition data of the occupant is received from the at least one thermal sensor, the method further comprises using the motorized HVAC vent to direct the conditioned air away from the occupant.

8. The method of claim 1, wherein based on the areas of thermal variance of the occupant it is determined that multiple surfaces of the occupant are experiencing thermal neglect, the method further comprises analyzing the areas of thermal variance to prioritize addressing one of the multiple surfaces with the conditioned air before addressing the remaining surfaces of the multiple surfaces.

9. The method of claim 8, wherein the one of the multiple surfaces that is prioritized is experiencing a greater amount of thermal neglect in comparison to the remaining surfaces of the multiple surfaces.

10. A vehicle comprising:

a cabin including a plurality of seats that each include an occupant sensor configured to generate a signal indicative of whether an occupant is present in a respective seat;

a thermal management system configured to provide thermal comfort to occupants of the vehicle, the thermal management system including:

a thermal management electronic control module in communication with each of the occupant sensors and configured to receive the signal indicative of whether an occupant is present in a respective seat;

at least one thermal sensor in communication with the thermal management electronic control module that is configured to generate thermal condition data of at least one occupant, the at least one thermal sensor generating the thermal condition data of the at least one occupant after receipt of an instruction from the thermal management electronic control module that is generated in response to the thermal management electronic control module receiving the signal from the occupant sensors; and an HVAC system in communication with the thermal management electronic control module, the HVAC system including a plurality of motorized HVAC vents, wherein the thermal management electronic control module is configured to receive the thermal condition data from the at least one thermal sensor and analyze the thermal condition data to determine areas of thermal variance of the at least one occupant; and after determining the areas of thermal variance of the at least one occupant, the thermal management electronic control module is configured to control the plurality of motorized HVAC vents to direct conditioned air to the at least one occupant based on the determined areas of thermal variance, wherein the thermal management electronic control module is configured to precondition the cabin prior to receiving the signals from the occupant sensors, and wherein after the preconditioning is complete and it has been determined by the thermal management electronic control module that the occupant has entered the vehicle, and before thermal condition data of the occupant is received from the at least one thermal sensor, the thermal management electronic control module is configured to control the motorized HVAC vent to direct the conditioned air away from the occupant.

11. The vehicle of claim 10, wherein the determined areas of thermal variance include surfaces of the occupant that are experiencing thermal neglect, and the thermal management electronic control module is configured to control the motorized HVAC vents to direct the conditioned air at or near the surfaces that are experiencing thermal neglect.

12. The vehicle of claim 10, wherein the thermal management electronic control module is configured to control an amount of time that the motorized HVAC vents direct the conditioned air at or near the surfaces that are experiencing thermal neglect so as to not oversaturate the surfaces.

13. The vehicle of claim 10, further comprising a thermal profile database in communication with the thermal management electronic control module.

14. The vehicle of claim 13, wherein the thermal profile database stores at least one of one or more lookup tables, one or more algorithms, and one or more machine learning models.

15. The vehicle according to claim 14, wherein the thermal management electronic control module is configured to analyze the thermal condition data received from the at least one thermal sensor in combination with the at least one of one or more lookup tables, one or more algorithms, and one or more machine learning models to determine whether the at least one occupant has one or more characteristics.

16. The vehicle according to claim 15, wherein the one or more characteristics include whether the at least one occupant has exposed skin, whether the at least one occupant is wearing clothing, whether the least one occupant has hair, and whether the at least one occupant has body parts arranged in a specific orientation.

* * * * *